Jan. 21, 1936.  A. R. WEIBEL ET AL  2,028,306
TIN POT FEEDER
Filed Jan. 25, 1935   7 Sheets-Sheet 1

INVENTORS
Alexander R. Weibel
William Jones
by their attorneys

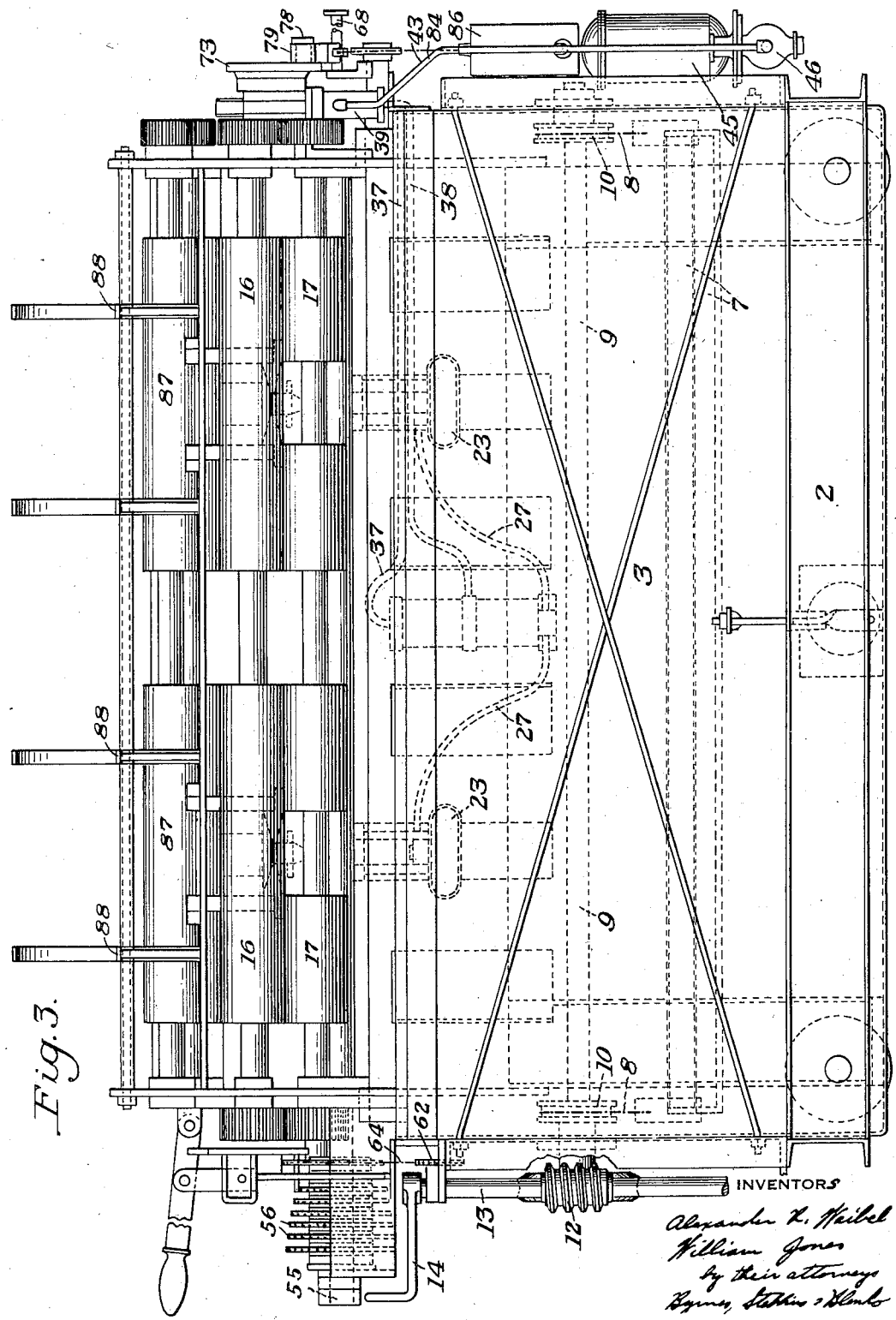

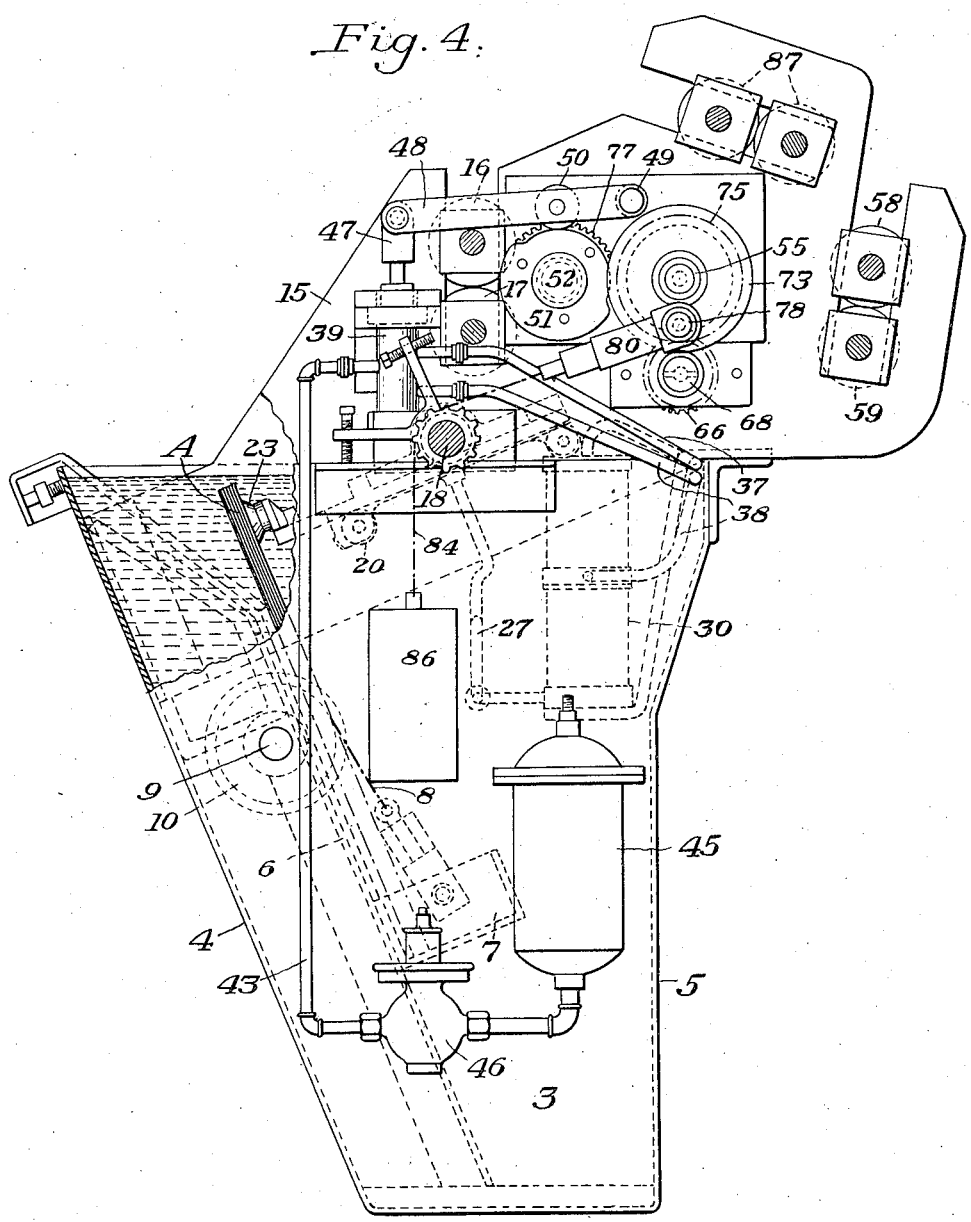

Jan. 21, 1936.  A. R. WEIBEL ET AL  2,028,306
TIN POT FEEDER
Filed Jan. 25, 1935   7 Sheets-Sheet 5
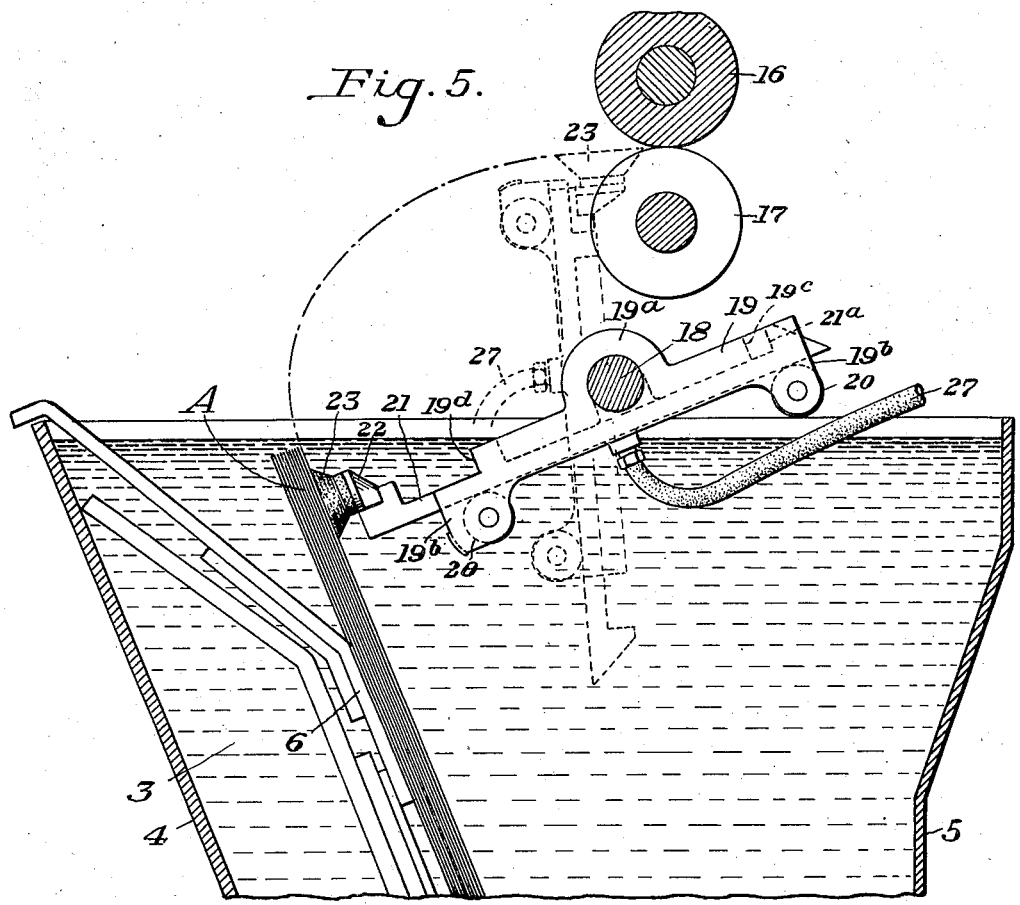
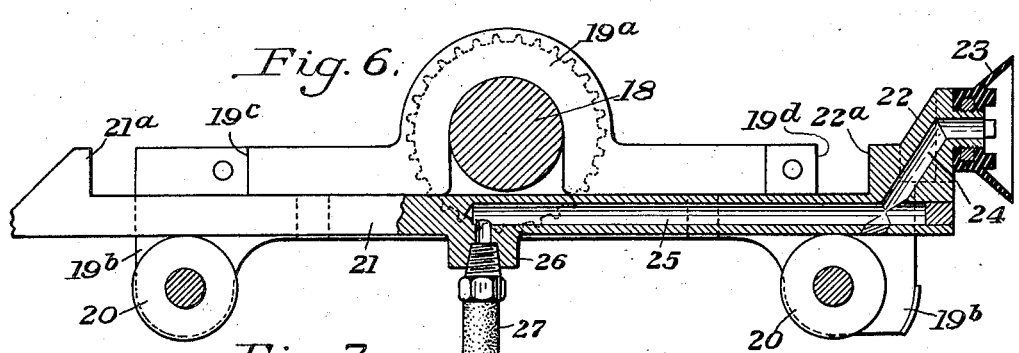
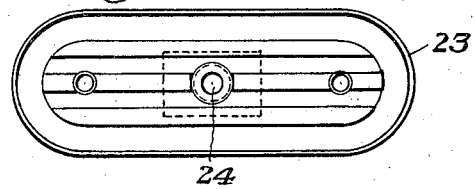
INVENTORS
Alexander R. Weibel
William Jones
by their attorneys
Byrnes, Stebbins & Blenko

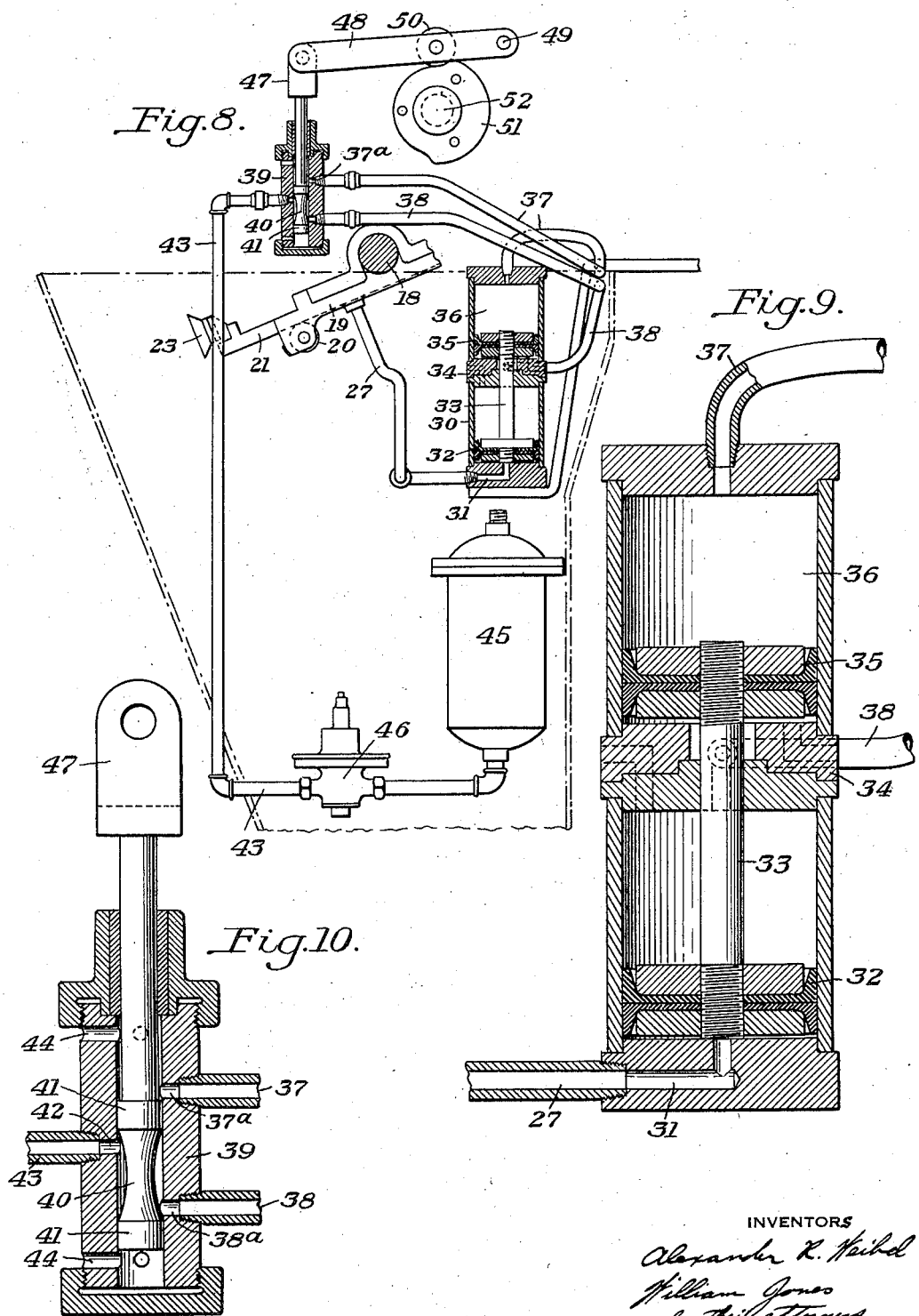

Jan. 21, 1936.　　A. R. WEIBEL ET AL　　2,028,306
TIN POT FEEDER
Filed Jan. 25, 1935　　7 Sheets-Sheet 7
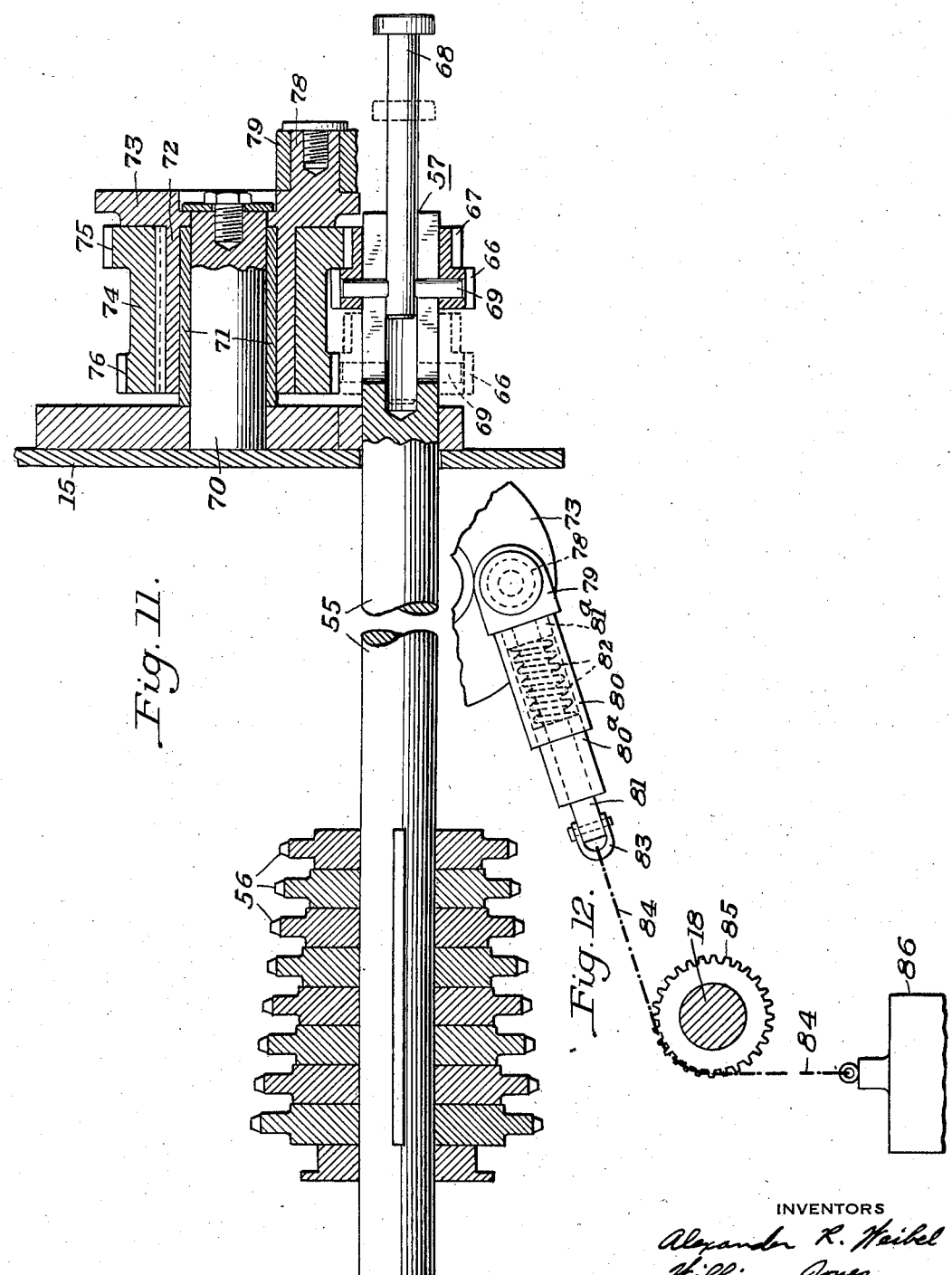
INVENTORS
Alexander R. Weibel
William Jones
by their attorneys Patented Jan. 21, 1936

2,028,306

UNITED STATES PATENT OFFICE 2,028,306

TIN POT FEEDER

Alexander R. Weibel and William Jones, Aliquippa, Pa., assignors to Jones & Laughlin Steel Corporation, Pittsburgh, Pa., a corporation of Pennsylvania Application January 25, 1935, Serial No. 3,462

12 Claims. (Cl. 271—27)

This invention relates to machines for feeding sheets of metal into tin pots for making tin plate, and commonly known in the art as "tin pot feeders", and is for an improved feeder for picking the sheets up one by one from a pack and introducing them into the first of a series of feed rolls.

Tin pot feeders have heretofore been constructed wherein the pack of sheets is placed edgewise in a water filled trough or receptacle. Mechanically operated suction cups are arranged to engage the top sheet of the pack, lift it up and feed it into the first of a series of feed rolls. According to the present invention there is an improved arrangement of suction devices for engaging the sheets and raising them one at a time from the pack into the feeder. According to the preferred embodiment of the present invention, such suction means is so arranged that the suction cups move through an arc of decreasing radius whereby the sheets are flexed to an increasing curvature which assists in the separation of sheets which tend to adhere together.

According to the present invention, there is further provided a novel arrangement of means for creating a partial vacuum in the suction cups at the proper time and for relieving such partial vacuum after the sheet has been moved into engagement with the first of the series of feed rolls. The arrangement is such that it may be readily adjusted for operation with sheets of varying sizes.

The invention may be readily understood by reference to the accompanying drawings, in which Figure 1 is a side elevation of a tin pot feeder embodying our invention.

Figure 3 is a front elevation of the feeder shown in Figures 1 and 2;

Figure 4 is a view generally similar to Figure 2, but on a slightly larger scale and showing certain portions of the machine in section;

Figure 5 is a detail view showing one of the suction cup feeders in position to engage and lift a sheet from the pack;

Figure 6 is a detail view of one of the suction cup feeding devices, the view being partly in side elevation and partly in section;

Figure 7 is a detail front elevation of one of the suction cups;

Figure 8 is a more or less diagrammatic view showing the pneumatic arrangement and control valve used in conjunction with the suction cup feeder;

Figure 9 is a detail view of the suction pump, the view being a vertical transverse section;

Figure 10 is a detail vertical section through the pneumatic valve casing through which the suction pump is controlled;

Figure 11 is a detached view showing a part of the gear changing mechanism by means of which the feeder is adapted to the feeding of sheets of different sizes; and Figure 12 is a detached view showing in detail the immediate mechanism on which the rock shaft of the suction cup devices is operated.

Figure 1:
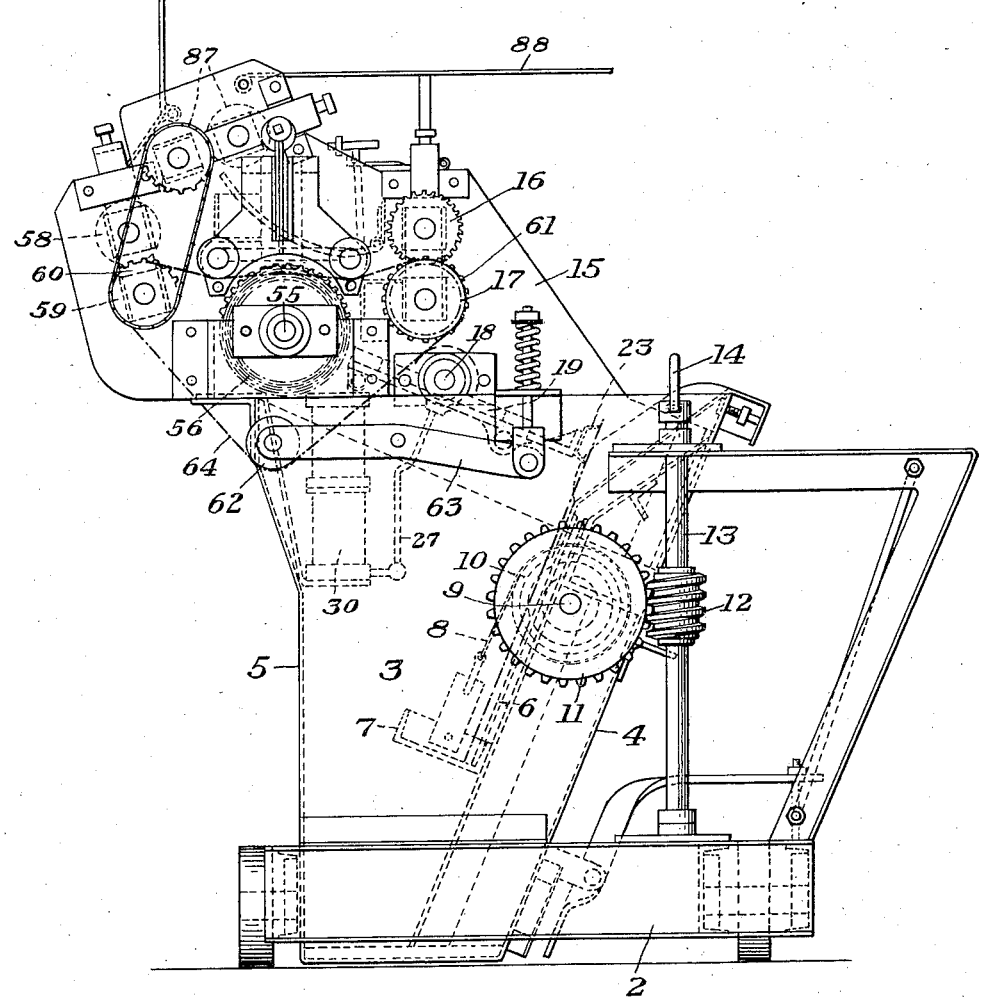
Figure 2:
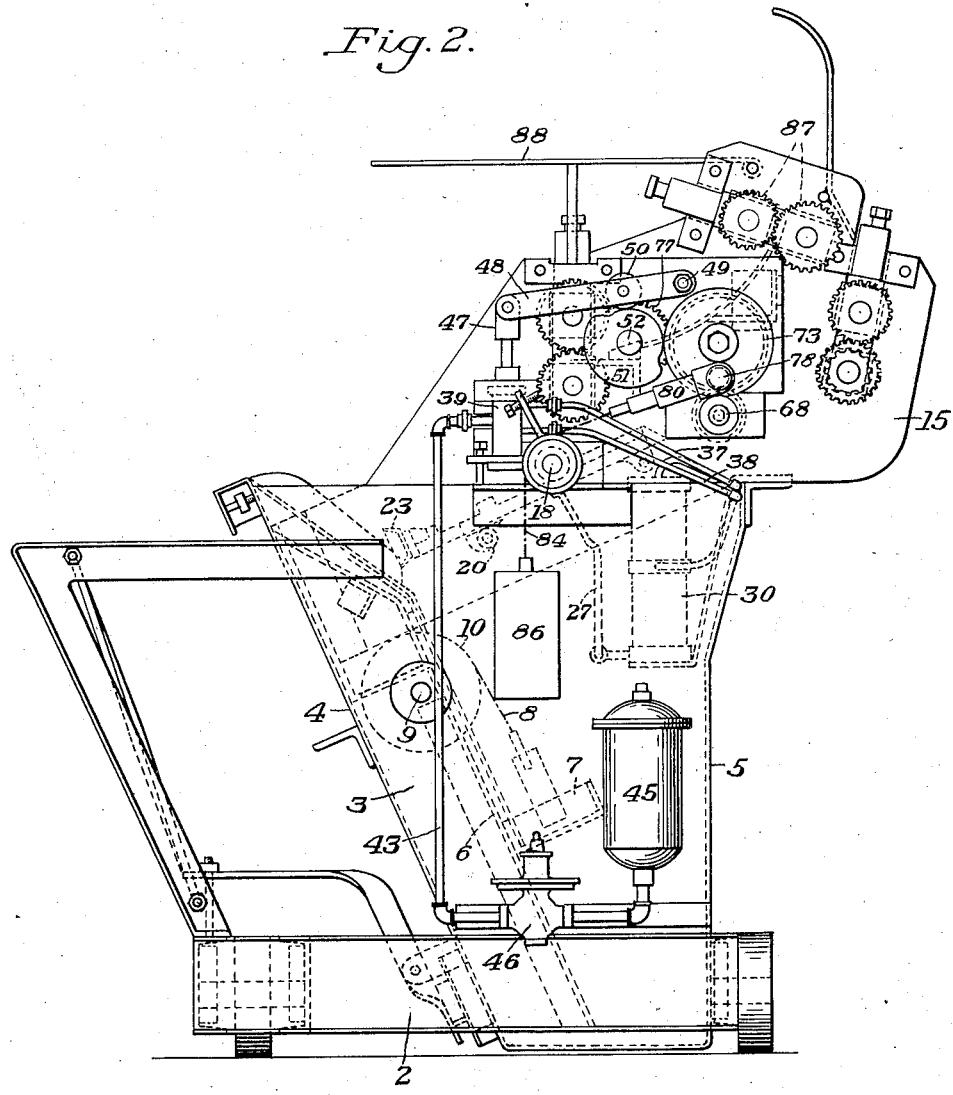
Figure 2 is a similar view from the opposite side of the feeder.

In the drawings, 2 designates generally the supporting frame of a tin pot feeder, the general construction and arrangement of the feeder being similar to those now in general use. Carried on the frame 2 is a receptacle or tank 3 having an inclined front wall 4 and a vertical rear wall 5, the top of the receptacle being open. Inside the tank 3 are inclined guiding or supporting bars 6. Within the tank and resting against the supporting or guiding bars 6 is a vertically adjustable basket 7. The construction and arrangement of the basket 7 and the guide bars 6 is such that a pack containing a large number of individual sheets may be set into the basket 7 and retained in an inclined position with the uppermost edges of the sheets in the pack below the level of the water in the tank. This is shown in Figures 4 and 5 wherein the pack of individual sheets is designated generally as A. By raising or lowering the basket 7, the machine can be adapted to the handling of packs of different sizes. If the sheets are shorter, the basket 7 may be raised from the position shown in Figure 4, and if the sheets are longer, the basket may be dropped lower down. By reason of having the basket adjustable for sheets of different sizes, the uppermost edge of the pack can always be maintained in the same relative relation to the feeding mechanism to be hereinafter more fully described.

Adjustment of the basket is provided for by means of chains or cables 8 attached to the opposite ends of the basket 7. Passing through the trough from one side to the other is a shaft 9 having drums 10 near the opposite ends thereof about which the cables or chains 8 are wound. One end of the shaft 9 passes through a gland in the end wall of the tank 3 and is provided with a worm wheel 11. This worm wheel engages a worm 12 carried on a shaft 13 at one end of the frame, the shaft 13 having a hand crank 14 thereon. By turning the crank 14 the basket 7 may be quickly raised or lowered to the desired extent.

Supported on frame members 15 at each side of the feeder above the top of the tank 3 is the feeding or conveying mechanism which includes a pair of upper and lower feeding rolls, these rolls being designated 16 and 17, respectively. These feeding rolls are the initial rolls of the feeding mechanism, serving to engage the sheets as they are fed one by one to these rolls and passing them onto other feed rollers by means of which they are eventually guided into the tin pot in the usual manner. The rolls 16, 17 are commonly provided on tin pot feeders of this general type and form no part of the present invention per se. In the operation of the tin pot feeders, the sheets which are positioned in the basket 7, are withdrawn from the pack one at a time, lifted up and fed into the feed rolls 16, 17. According to the present invention, this is accomplished by a pneumatic feeding device of unique construction. This feeding mechanism comprises a transversely extending rock shaft 18 supported in the side frame members 15 above the top of the tank 3. Secured to this rock shaft for movement with the shaft are carrier members 19, best shown in Figures 5 and 6, these carriers having a yoke portion 19a which fits over the shaft 18 and having depending lug portions 19b at opposite ends thereof in which are supported rollers 20. In the carrier 19 is a relatively movable bar 21 which rides on the rolls 20. At one end of this bar there is a hook-like stop element 21a adapted to contact with a fixed shoulder 19c on the carrier 19 to limit the relative movement of the bar 21 in one direction. At the opposite end of the bar 21 is a head portion 22, the rear shoulder 22a of which is adapted to contact with the vertical shoulder 19d of the carrier 19 for limiting the relative longitudinal movement of the bar 21 in the other direction. Between the limits imposed by the stops 19c and 19d, the bar 21 can freely shuttle back and forth in a direction transverse to the axis of the shaft 18, the rollers 20 providing an anti-friction mounting for this back and forth reciprocating or shuttle movement.

The head portion 22 of the bar 21 carries at its forward end a heavy rubber cup 23. This cup is preferably of relatively short vertical height but relatively wide, as shown in Figure 7. The head 22 has a passageway 24 therein which opens into the vacuum cup 23 and which communicates with a longitudinally extending passageway 25 in the bar 21. At the middle of the bar 21 there is a nipple 26 to which a flexible hose or tubing 27 is connected whereby air may be supplied to or exhausted from the cup 23 through the hose 27.

The rock shaft 18 moves through an arc slightly in excess of 90°. When the shaft is rotated to bring the carrier 19 to the position shown in Figure 5, the carrier has a slight forward inclination. The slight forward inclination of the carrier causes the bar 21 carried on the rollers 20 to slide forwardly, i. e., to the left as viewed in Figure 5. When the bar 21 slides forward in this fashion, the cup 23 comes into contact with the top sheet in the pack A. The sheet itself stops the forward travel of the bar by reason of the cup coming into contact with the sheet. Should the rock shaft be tipped to this position when no sheets were in the tank, the stop 21a cooperating with the stop 19c of the carrier, would limit this forward movement of the bar 21.

According to the present invention, when the suction cup 23 comes into contact with the top sheet in the pack A, the air or water is partially exhausted from the interior of the cup, whereby the cup is caused to adhere to the sheet by suction. In the next operation of the machine, the shaft 18 rotates to bring the carrier to the dotted-line position shown in Figure 5. Since the suction cup is adhering to the sheet, the sheet is lifted up and its upper edge is thus caused to follow approximately the curve indicated in Figure 5, the edge of the sheet eventually being brought into the bite of the rolls 16, 17. When the carrier 19 has moved from the full line position shown in Figure 5 toward the dotted line position, with the sheet being carried upwardly by the suction cup, the bar 21 tends to slide in the opposite direction from that previously described, causing the suction cup when it reaches a vertical position, to drop down toward the shaft 18. By reason of this it will be seen that the edge of the sheet is carried through an arc of changing radius, the sheet being bent to a very considerable degree.

This sharp bending of the sheet has an important function in the operation of the feeder. If the top sheet in the pack A tends to stick to the sheet immediately under it, both sheets start to lift when the suction cup moves upwardly. However, when the sheet which is held by the suction cup starts to bend through this sharp curve of diminishing radius, the adhering sheet by reason of its inherent resilience, resists such bending and tends to move straight up. When the two sheets are moving up in diverging paths, i. e., one following the path which it has to follow by reason of its being held by the vacuum cup, and the other following the path which it tends to take by reason of its own resilience, separation of the sheets will eventually take place and the adhering sheet will drop back into its position, permitting the top sheet alone to enter the feed rolls 16, 17.

We have found that this feeding mechanism very substantially reduces the number of "doubles", i. e., adhering sheets which reach the feed rolls 16, 17.

According to the present invention, after the edge of a sheet has been brought into engagement with the rolls 16, 17, the suction cup 23 is released from engagement with the sheet, the rock shaft 18 returns to the position shown in Figure 5, and the cycle of feeding is repeated.

In the preceding description, we have referred to but a single suction cup. However, the rock shaft 18 preferably carries more than one of these suction cup units, two of them being provided in the particular machine illustrated, the two units being at opposite sides of the middle, as appears from Figure 3.

The operation of the suction cup is effected through a pump unit and valve system best shown in Figures 8, 9 and 10. The hose 27 leading from the cup carrying bar 21 communicates with one end of a pump cylinder unit 30 through a port 31. Within the cylinder 30 is a plunger or piston 32 having a rod 33 passing through a central partition 34 in the cylinder unit and having a second piston or plunger 35 thereon at its upper end. The piston 35 is in a chamber or cylinder 36 separate from the chamber or cylinder in which the piston or plunger 32 operates. When the piston 32 moves upwardly, it creates a suction in the line 27 leading to the suction cups 23. When the plunger 32 moves downwardly, water or air or other fluid is forced out through the pipe 27 into the suction cup, causing the immediate release of the suction cup from the sheet with which it is engaged. The piston 32 is operated through the reciprocation of the piston 35. This is effected in turn by the alternative admission of air pressure to opposite sides of the piston 35. For this purpose an air pipe 37 leads into the top of the chamber 36 on one side of the piston 35 while an air pipe 38 opens into the chamber 36 on the other side of the piston 35 through a central port in the partition 34. Pipe 37 communicates with a port 37a in a control valve unit 39. Pipe 38 communicates with a port 38a in the same control valve unit. The control valve comprises a cylindrical body having a reciprocable plunger-like valve element 40 therein, the construction of the valve being clearly shown in Figure 10. Valve member 40 has separated valve portions 41 thereon with a portion of reduced diameter between the valve portions 41. Fluid such as air under pressure is introduced into the valve chamber through a single port 42, the fluid being supplied through a line 43. At each end of the valve casing is an exhaust port 44. The valve 40 moves between two extreme positions. In Figure 10, it is in the lowermost of these positions, and in this position air under pressure supplied through the pipe 43 can pass out the port 38a into the pipe 38. When this occurs, the piston 35 is lifted to lift the piston 32 and create a suction in the suction cups 23. When the piston 35 is moving upwardly, air is expelled from the chamber 36 through the pipe 37, port 37a and out the exhaust port 44. At the other limit of its travel, the valve 40 permits air from the pipe 43 to flow into the pipe 37 to force the piston 35 down, the air in the chamber 36 under the piston 35 exhausting through the pipe 38 and at the lowermost exhaust port 44. In Figure 8 we have indicated the pipe 43 as being connected with an air reservoir 45 through a reducing valve 46.

Several advantages reside in this arrangement for creating and relieving the pressure in the suction cups. Whereas suction cups have heretofore been provided in sheet feeders of this nature, there has generally been provided a continuously operating suction cup with valves in the suction line which open to communicate with the suction cups at predetermined time intervals. With such systems, a large volume of water is necessarily exhausted through the exhaust pump, and the exhaust pump had to be of an appreciable capacity. Moreover, in such devices, the suction in the suction cups is relieved by venting the suction line to the atmosphere. According to our invention, the suction line is a relatively short one, terminating in the pump unit 39. The capacity of the pump unit 30 need only be sufficient to assure the creation of an adequate degree of vacuum in the cups 23, and with each stroke of the pump only a very limited amount of fluid is drawn in. On the down stroke of the plunger 32, such fluid as is drawn into the cylinder is positively forced out into the suction cups and a pressure created above atmospheric pressure to cause the release of the cups from the sheet. Instead of having a suction line leading to the feeder, it is only necessary to have an air pressure line, the air pressure being used merely to operate th pump through its short stroke.

The arc through which the shaft 18 moves is substantially constant irrespective of the size of the sheet being fed into the tin pot. It is therefore important that the basket 7 be adjusted to the proper vertical height to enable the suction cup to engage the sheets sufficiently below the top edge of the sheets to enable it to project such edge into the bite of the rolls 16, 17 and not too far down from the top edge of the sheet.

It will, of course, be appreciated that the time required to feed a larger or longer sheet is greater than the time required to feed a smaller or shorter sheet. The present invention provides for the automatic operation of the valve unit 39 and the variation in the period of operation according to the size of the sheet being operated upon.

For the operation of the movable valve element in the valve unit 39, there is provided at the upper end of the member 40 a connector member 47 to which is pivotally connected the free end of a lever 48, which lever has a fixed fulcrum at 49 on one of the side frame members 15. The lever 48 is provided intermediate its ends with a roller 50. This roller bears on a peripheral cam 51 on a stub shaft 52. Approximately one half of the periphery of the cam 51 is lower than the other half. When the roller 50 rides onto the lower portion of the cam, the valve member 40 drops to permit air to flow into the pipe 38 and when the roller 50 rides onto the high part of the cam, the valve member 40 is moved to the upper limit of its travel. Thus with each revolution of the cam 51, the valve has a complete cycle of operation. By changing the speed at which the cam 51 is rotated, the frequency of the operating cycle can be changed, being made longer or shorter according to the size of the sheets.

It is necessary, of course, that the operation of the valve be correlated to the operation of the shaft 18 on which the suction devices are carried. Consequently, our invention provides for the interconnection of the drive for the cam and the drive for the shaft 18 in such manner that the operating cycle of each will be simultaneously changed to the same extent. To this end there is provided a main cross shaft 55 in the feeding mechanism above the tank, having a graduated series of sprocket wheels 56 at one end thereof and having a variable gear shift device designated generally as 57 (see Figure 11) at the opposite end thereof. At the back of the machine is a second pair of inter-geared feed rollers 58, 59. The shaft for the roller 59 carries a sprocket wheel 60 (see Figure 1). The shaft of the roller 17 carries a sprocket wheel 61. An idler sprocket to take up slack is provided at 62, this sprocket being carried on a spring-actuated lever 63. A sprocket chain 64, indicated by the chain line in Figure 1, passes around the sprocket 60 over one of the series of graduated sprockets 56, around the sprocket 61, and around the idler 62. By reason of this arrangement, when the chain 64 is shifted from one sprocket of the series 56 to another sprocket of the same series, the speed of rotation of the shaft 55 is changed, or the relative speeds between the shaft 55 and the feed rollers 16, 17 and 58, 59, is changed.

The speed unit 57 on the opposite end of the shaft 55 comprises merely a pair of gear wheels or pinions 66 and 67 of different diameters, slidable along the shaft 55, the two pinions being connected together. The shaft 55 has a longitudinally extending opening therein and a laterally extending key slot. Extending into this opening is a push rod 68 which is provided with a transverse key 69 that connects to the double pinion 66, 67. Mounted on one of the side plate members 15 adjacent the double pinion 66, 67 is a stub shaft 70 on which is a bushing 71 about which is mounted a hub member 72, the member 72 having a disc 73 at its outer end. Keyed to the outside of the hub member 72 is a member 74 having two annular series of teeth thereon designated 75 and 76, respectively, the annular series of teeth 75 being of greater diameter than the series of teeth 76. When the speed change unit 57 is in the position shown in Figure 11, the smaller pinion 67 engages the larger annular gear 75, causing the hub member 72 to be rotated. When the rod 68 is pushed to the other limit of its movement, the larger pinion 66 then engages the smaller annular gear 76, and the hub member 72 is again driven, but at a speed slower than where the gears 67, 75 are in mesh.

The cam 51 carried on its stub shaft 52 has fixed to one face thereof a gear 77 which also meshes with the gear 75. The shaft 55 thus serves to transmit motion through the pinions 66 or 67 and the gears 75 or 76 to the cam 51. It will be seen that the speed change unit 57 provides two effective operating speeds for the cam 51 for each one of the sprockets in the graduated series of sprockets 56, giving a wide range of speed changes for a wide range of sheet sizes.

The disc 73 on the hub 72 has a projecting pin 78 thereon. This pin 78 is rotatably received in an opening or socket of a connector member 79 shown in detail in Figure 12. The connector member 79 has a hollow extension 80 thereon in which is slidably received a pull rod 81, the pull rod having a head portion 81a inside the extension 80. A compression spring 82 is disposed between the head 81a and a closure member 80a at the outer end of the extension 80. The pull rod 81 is provided with a clevis 83 to which is connected one end of a sprocket chain 84. This sprocket chain passes over a sprocket wheel 85 on the rock shaft 18 and has a weight 86 secured to its lower end. The spring 82 is sufficiently strong to normally resist compression, and raise and lower the weight 86 with the rotation of the disc 73. This movement of the chain imparts an oscillating motion to the shaft 18 sufficient to move the suction devices through the arc in which they operate. The spring provides a yieldable connection, however, which will give in the event of the suction devices becoming jammed in any way. The gear ratio between the gear 75 and the cam-driving gear 77 is such that one revolution of the hub member 72 causes one complete revolution of the cam. One complete revolution of the hub member 72 with its crank disc 73 also causes one complete oscillating cycle of the rock shaft 18.

It will therefore be seen that we have provided means by which the frequency of the operating cycle of the cam 51 and the operating cycle of the rock shaft 18 can be changed to give a longer period of time for longer sheets and a shorter period of time for shorter sheets while maintaining the same operating relation between the cam and the rock shaft so that the valve will always cause a suction to be created in the cups 23 just as they are engaging the sheets, and relieve the suction just as the leading edge of the sheets engages the first feed rollers.

In the event that two sheets stick together and simultaneously enter between the feed rollers 16, 17, we have provided a double throw-out mechanism which will operate to support the adhering sheets and cause one of the two sheets to be thrown up between rolls 87 and discharge onto a receiving rack 88. This double throw-out mechanism, while generally illustrated in the present drawings is fully shown, described and claimed in our copending application, Serial No. 3,461, filed January 25, 1935.

By reason of the arrangement of the suction cups on the ends of the reciprocable bars 21, the suction cups will move by gravity into engagement with the top sheet of the pack. As the number of sheets in the pack diminishes, the cups will automatically project further out, thus continuously and automatically taking care of the change in the thickness of the pack caused by the successive removal of sheets and the replacement of additional sheets from time to time. The bars 21 will not roll on the rollers 20 until the carriers 19 have actually been tilted below a horizontal position, so that the cups cannot come into engagement with the sheets prematurely or before the time when they are a proper distance below the top edge of the sheets. This assures substantially uniform engagement of the cups with the sheets, prevents any unnecessary rubbing of the rubber cups against the sheets, and provides a feed which functions with uniformly successful results. Further advantages of the invention reside in the shortening of the radius of curvature as the sheet is carried up to facilitate the separation of doubles. Still further advantages result from the pump arrangement operated through compressed air, whereby only a limited suction is created within the cups and whereby a positive pressure is created within the cups to cause the release at the proper time.

Still further advantages of the invention reside in the provision of means for varying over a wide range the frequency of the operating cycle while keeping the mechanism synchronized, thus adapting it to the feeding of sheets of various sizes, it being possible to quickly make the necessary adjustments when a change-over in the size of sheets being operated upon is made. Moreover, the arrangement of the apparatus is such that practically all of the operating mechanism is above the level of the water in the tank while the suction cups themselves operate under the surface of the water at the time when they engage the sheets. The apparatus is relatively simple, operates with precision, and provides an exceedingly rapid means for feeding the sheets. At the same time, the arrangement is such that no undue strain is put on the mechanism in the event that any jam does develop.

While we have illustrated and described in detail one particular preferred embodiment of our invention, it will be understood that this is merely by way of illustration and that various changes and modifications in the particular construction and arrangement can be made within the contemplation of our invention and under the scope of the appended claims.

We claim:

1. In a tin pot feeder a suction cup mechanism comprising a carrier arranged to oscillate in a vertical arc, a radially movable member on the carrier operable by gravity from an extended position at the bottom of the vertical arc through which the carrier moves to a retracted position when the carrier reaches the upper limit of said arc, and a suction cup on said member.

2. A tin pot feeder of the class described comprising a carrier mounted for oscillation in a vertical arc, having a guideway therein, a freely movable member reciprocable along the guideway in a direction transverse to the axis of movement of the carrier, said member being operable by gravity from an extended position at the bottom of the vertical arc through which the carrier moves, to a retracted position when the carrier reaches the upper limit of said arc and a suction cup at one end of said member.

3. In a tin pot feeder, a carrier mounted for movement in a vertical arc and movable from a position where the forward end thereof is inclined below the horizontal to a position where the carrier has a nearly vertical inclination, a member supported on the carrier movable substantially radially with respect to the axis of rotation of the carrier, said member being operable by gravity from an extended position at the bottom of the vertical arc through which the carrier moves, to a retracted position when the carrier reaches the upper limit of said arc and a suction cup on said member.

4. In a tin pot feeder, a carrier mounted for movement in a vertical arc and movable from a position where the forward end thereof is inclined below the horizontal to a position where the carrier has a nearly vertical inclination, a member supported on the carrier movable substantially radially with respect to the axis of rotation of the carrier, and a suction cup on said member, said member being supported in the carrier to move with respect thereto under the influence of gravity whereby the suction cup is carried downwardly and outwardly when the carrier is inclined with respect to the horizontal, and moves inwardly by gravity as the carrier moves toward a vertical position.

5. A tin pot feeder comprising means for supporting a pack of sheets in an edgewise position, a pair of horizontal feed rollers, and means for engaging the sheets of said pack one at a time and moving them through an arc of upwardly decreasing radius from their position in the pack into engagement with the feed rolls.

6. In a tin pot feeder, means for supporting a pack of sheets in one plane, a pair of feed rolls arranged to operate in another plane, and means for successively engaging the uppermost sheets in the pack and moving said sheets in such manner that the leading edge of each sheet traverses a substantially involute curve, and projecting said leading edge of the sheet into engagement with the feed rolls.

7. A tin pot feeder comprising means for supporting a pack of sheets in edgewise position, a pair of feed rolls, a rock shaft, and radially extensible means on the shaft having a suction cup at the outer end thereof for feeding sheets into the feed rolls, said radially extensible means being freely operable at any position of the shaft under the influence of gravity.

8. In a tin pot feeder, a suction cup for engagement with the sheets mounted for movement through a vertical arc, a suction line connected with said cup, a pump cylinder to which one side of said suction line leads, a piston in said cylinder, and fluid pressure actuated means for reciprocating the piston through one complete up and down movement with each sheet which is operated upon.

9. A sheet feeder for tin pots and the like wherein an oscillating suction device is used to lift each successive sheet from a pack and deliver it to conveying means, characterized by the provision of a reciprocating suction pump connected with the suction device, means for operating the pump through only one complete cycle with each cycle of oscillation of the suction device, said means comprising an air cylinder and a piston connected to the pump, a valve for controlling the operation of the piston, and means for actuating the valve in timed relation to the movement of the suction device.

10. A sheet feeder for tin pots and the like wherein an oscillating suction device is used to lift each successive sheet from a pack and deliver it to conveying means, characterized by the provision of a reciprocating suction pump connected with the suction device, means for operating the pump through only one complete cycle with each cycle of oscillation of the suction device, said means comprising an air cylinder and a piston connected to the pump, a valve for controlling the operation of the piston, means for actuating the valve in timed relation to the movement of the suction device, the suction device being carried on a rock shaft, means for varying the operating time of the rock shaft, and means for simultaneously varying the operation of said valve-actuating means.

11. A sheet feeder of the class described comprising means for supporting a pack of sheets, an oscillating suction cup mechanism for feeding the sheets one at a time from the pack, a valve mechanism through which the creation and release of suction in the suction cup is controlled, a cam for operating the valve, and a common driving means for operating said cam and for oscillating the suction cup device.

12. A sheet feeder of the class described comprising means for supporting a pack of sheets, an oscillating suction cup mechanism for feeding the sheets one at a time from the pack, a valve mechanism through which the creation and release of suction in the suction cup is controlled, a cam for operating the valve, and a common driving means for operating said cam and for oscillating the suction cup device, said common operating means including a driving shaft having a plurality of driving gear wheels of different diameters thereon for selective cooperation with a driving element, and having a speed change gear at its opposite end.

WILLIAM JONES.
ALEXANDER R. WEIBEL.